US010974682B2

(12) United States Patent
Iwata et al.

(10) Patent No.: US 10,974,682 B2
(45) Date of Patent: Apr. 13, 2021

(54) CURTAIN AIRBAG DEVICE AND STRUCTURE FOR MOUNTING TO VEHICLE

(71) Applicants: Autoliv Development AB, Vårgårda (SE); Tetsuya Iwata, Yokohama (JP); Hiroki Ishihara, Yokohama (JP); Akihiro Kawada, Yokohama (JP)

(72) Inventors: Tetsuya Iwata, Yokohama (JP); Hiroki Ishihara, Yokohama (JP); Akihiro Kawada, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 400 days.

(21) Appl. No.: 16/066,221

(22) PCT Filed: Nov. 25, 2016

(86) PCT No.: PCT/JP2016/085057
§ 371 (c)(1),
(2) Date: Jun. 26, 2018

(87) PCT Pub. No.: WO2017/122435
PCT Pub. Date: Jul. 20, 2017

(65) Prior Publication Data
US 2020/0269799 A1    Aug. 27, 2020

(30) Foreign Application Priority Data
Jan. 15, 2016    (JP) .............................. JP2016-006177

(51) Int. Cl.
*B60R 21/232*    (2011.01)
*B60R 21/213*    (2011.01)
(Continued)

(52) U.S. Cl.
CPC .......... *B60R 21/232* (2013.01); *B60R 21/201* (2013.01); *B60R 21/213* (2013.01); *B60R 21/237* (2013.01); *B60R 2021/161* (2013.01)

(58) Field of Classification Search
CPC ... B60R 21/201; B60R 21/213; B60R 21/232; B60R 21/237; B60R 2021/161
See application file for complete search history.

(56) References Cited

U.S. PATENT DOCUMENTS 6,517,110 B1 * 2/2003 Butters ................. B60R 21/201
                                                  280/730.2
6,808,199 B2 * 10/2004 Saderholm ............ B60R 21/201
                                                  280/728.2
(Continued)

FOREIGN PATENT DOCUMENTS

DE    102007022152 A1 * 11/2008 .......... B60R 21/232
GB         2440672 A      2/2008
(Continued)

OTHER PUBLICATIONS

International Search Report for PCT/JP2016/085057, ISA/JP, Tokyo, dated Jan. 10, 2017, with English Translation.
(Continued)

*Primary Examiner* — Laura Freedman
(74) *Attorney, Agent, or Firm* — Stephen T. Olson; Harness, Dickey & Pierce, P.L.C.

(57) ABSTRACT

An airbag device has an airbag that is wound in a rolled state, mounted in a vehicle longitudinal direction of a vehicle and deployable in a curtain-like manner in a vehicle compartment by a gas generated by an inflator in case of emergency. A cover cloth is provided so as to be wound to cover at least part of an outer circumference of the airbag extending in a longitudinal direction. The cover cloth has a first folded-back part that is formed by folding back one end of the cover cloth in a circumferential direction of the outer (Continued)

circumference of a cross section, which is perpendicular to the longitudinal direction of the folded airbag. An edge of the outer circumference of the airbag is held between the first folded-back part and the other end of the cover cloth.

20 Claims, 7 Drawing Sheets

(51) Int. Cl.
*B60R 21/237* (2006.01)
*B60R 21/201* (2011.01)
*B60R 21/16* (2006.01)

(56) References Cited

U.S. PATENT DOCUMENTS

| | | | | |
|---|---|---|---|---|
| 6,955,377 | B2* | 10/2005 | Cooper | B60R 21/233 280/743.1 |
| 7,083,188 | B2* | 8/2006 | Henderson | B60R 21/201 280/728.2 |
| 7,527,287 | B2* | 5/2009 | Kjell | B60R 21/201 280/728.2 |
| 7,568,730 | B2* | 8/2009 | Kwon | B60R 21/201 280/728.2 |
| 7,641,220 | B2* | 1/2010 | Visker | B60R 21/20 280/728.2 |
| 7,661,705 | B2* | 2/2010 | Jacobsson | B60R 21/217 280/730.2 |
| 7,731,230 | B2* | 6/2010 | Fischer | B60R 21/205 280/732 |
| 7,744,121 | B2* | 6/2010 | Ishikawa | B60R 21/2346 280/730.2 |
| 7,770,925 | B2* | 8/2010 | Seymour | B60R 21/205 280/743.1 |
| 7,823,914 | B2* | 11/2010 | Cheal | B60R 21/201 280/730.2 |
| 7,980,585 | B2* | 7/2011 | Cheal | B60R 21/201 280/728.2 |
| 8,056,924 | B2* | 11/2011 | Hatfield | B60R 21/201 280/730.2 |
| 10,384,636 | B2* | 8/2019 | Shimizu | D04H 3/011 |
| 2011/0291393 | A1 | 12/2011 | Nakamura et al. | |

FOREIGN PATENT DOCUMENTS

| | | | |
|---|---|---|---|
| JP | 2006-103478 | A | 4/2006 |
| JP | 2006335135 | A | 12/2006 |
| JP | 2007131243 | A * | 5/2007 |
| JP | 2009-126476 | A | 6/2009 |
| JP | 2010-006101 | A | 1/2010 |
| JP | 2011-246078 | A | 12/2011 |
| JP | 2013-208978 | A | 10/2013 |
| JP | 2014-65329 | A | 4/2014 |
| WO | 2008109396 | A2 | 9/2008 |

OTHER PUBLICATIONS

Written Opinion of the ISA for PCT/JP2016/085057, ISA/JP, Tokyo, dated Jan. 10, 2017.
International Preliminary Report on Patentability received for the International Application No. PCT/JP2016/085057, dated Jul. 26, 2018, 8 pages.
Office Action received for the Japanese Application No. 2017561531, dated Jan. 8, 2019, 8 pages (4 pages of Original Copy and 4 pages of English Translation).
Office Action received for the Japanese Application No. 2017561531, dated Mar. 12, 2019, 10 pages (5 pages of Original Copy and 5 pages of English Translation).
Decision to Grant received for the Japanese Application No. 2017561531, dated Jun. 18, 2019, 5 pages (3 pages of Original Copy and 2 pages of English Translation).
Extended European Search Report received for the European Application No. 16885038.6, dated May 27, 2019, 7 pages.
Office Action received for the European Application No. 16885038.6, dated Jan. 2, 2020, 3 pages.
Decision to Grant received for the European Application No. 16885038.6, dated Oct. 14, 2020, 8 pages.

* cited by examiner

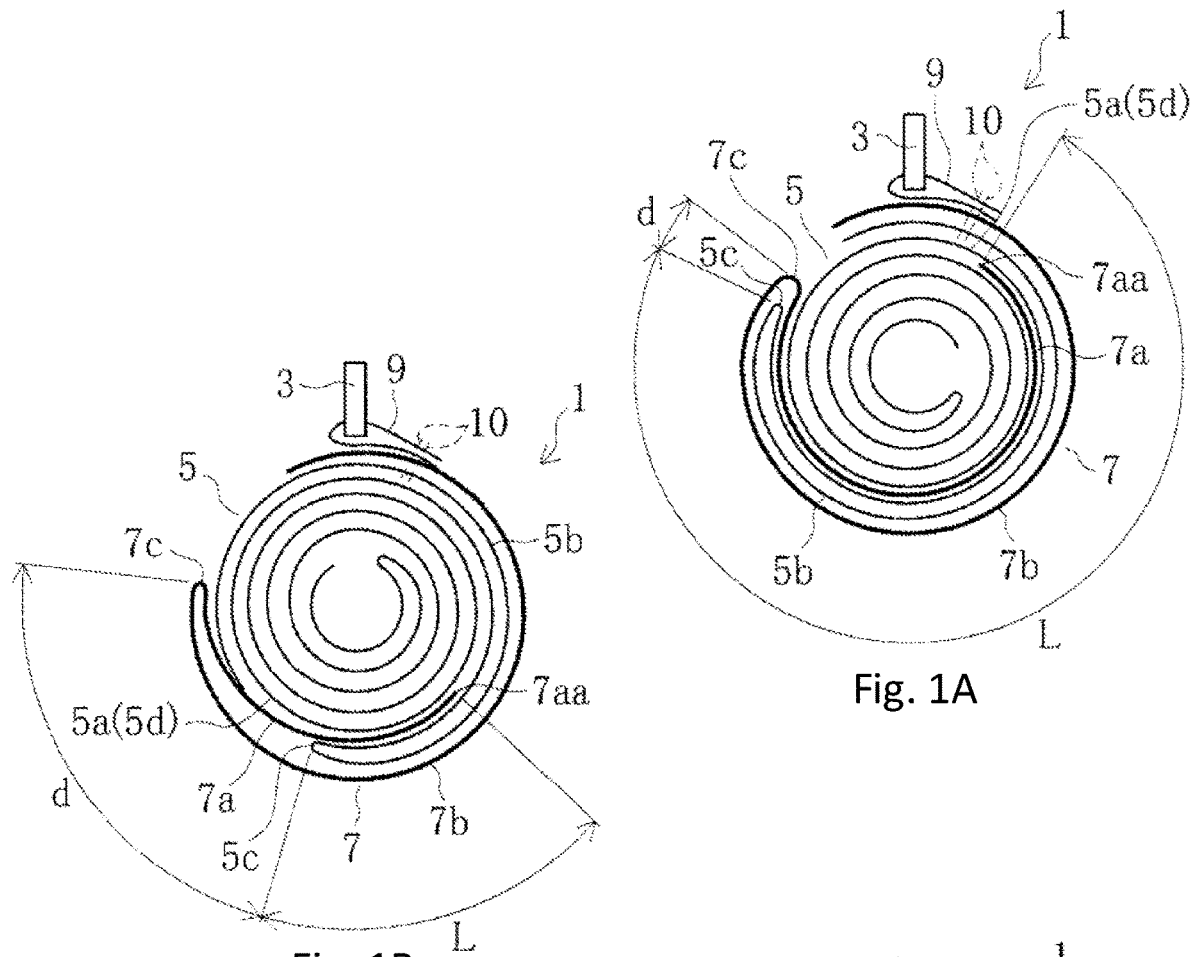
Fig. 1A
Fig. 1B
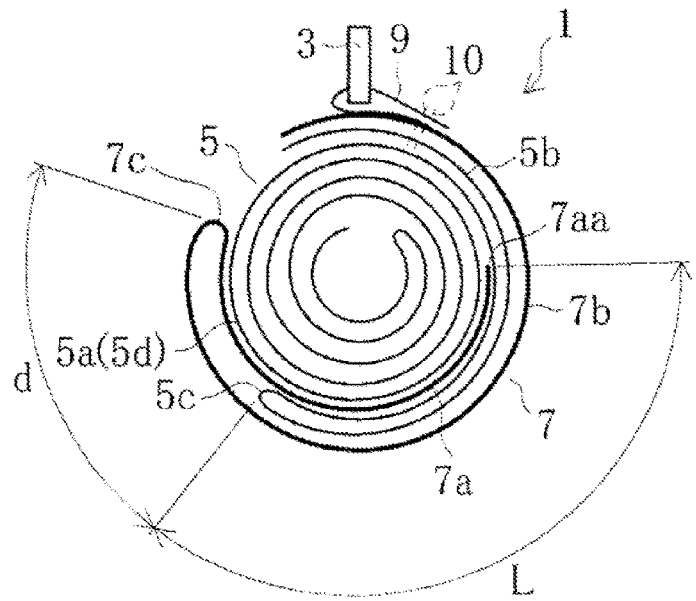
Fig. 1C

CURTAIN AIRBAG DEVICE AND STRUCTURE FOR MOUNTING TO VEHICLE

CROSS-REFERENCE TO RELATED APPLICATIONS

This application is a 371 U.S. National Stage of International Application No. PCT/JP2016/085057, filed Nov. 25, 2016, which claims the benefit of Japanese Patent Application No. JP 2016/006177, filed Jan. 15, 2016. The entire disclosures of the above applications are incorporated herein by reference.

TECHNICAL FIELD

The present invention relates to a curtain airbag device in which an airbag is deployed in a curtain-like manner along a side window in a side collision or a rollover so as to protect an occupant's head and prevent the occupant from being thrown out to the outside of a vehicle, and a mounting structure of such device on the vehicle. Specifically, it is prevented that an edge of a pillar trim covering (a pillar garnish) is broken and scattered when the airbag is deployed.

In the following explanation, according to the present application, the terms "above" and "up" denote a ceiling side of a motor vehicle, and the terms "below" and "down" denote a floor side of the motor vehicle. In addition, the terms "front" and "forward" denote a forward direction side of the motor vehicle, and the terms "rear" and "backward" denote a retreating direction side of the motor vehicle.

BACKGROUND ART

When a high load is applied on a side of a motor vehicle in a side collision or a rollover, a curtain airbag device causes an inflator to be operated so as to generate a gas and deploys an airbag in a vehicle compartment in the curtain-like manner in a vertically lower direction along the side window.

As shown in FIG. 9, such curtain airbag device 1 is mounted by using clips 2 and brackets 3, for instance, from a roof side rail RSR toward a front pillar FP.

The curtain airbag device 1 in the mounting state explained above is covered by a front pillar trim covering and a room head lining (a roof trim covering) inside the vehicle compartment, and is stored at the outside of the vehicle compartment with respect to these trim coverings.

Further, in the side collision or the rollover, an airbag 5 that is wound in, for instance, a roll state, is deployed by the gas that is generated by an inflator 4. As a result, the front pillar trim covering and the room head lining are pushed toward an inside of the vehicle compartment and are disengaged from the front pillar FP and the roof side rail RSR of a vehicle body.

After they are disengaged, edges being disengaged from the front pillar trim covering and the room head lining are pushed and expanded toward the inside of the vehicle compartment so that the airbag is deployed in the curtain-like manner in the vehicle compartment from such opening that is formed by being pushed and expanded.

By the way, for instance, in regards to the airbag that is wound in the roll state, there is a case in which a predetermined position of the airbag in a longitudinal direction is covered by a cover cloth that regulates a deployment direction. In this case, at the time of deploying the airbag, because a tape that fixes the cover cloth is broken so as to release the cover cloth, the airbag is deployed in a predetermined direction.

However, depending on a covering condition in which the cover cloth covers the airbag, there is a case in which at the time of deploying the airbag, the cover cloth cannot be released well. In that case, the airbag may be caught inside the front pillar trim covering because the deployment direction of the airbag is changed. When the deployment is continued in such state, there is a possibility that the front pillar trim covering is damaged (refer to paragraph [0008] of Patent Document 1).

PRIOR ART DOCUMENT

Patent Document 1: Japanese Patent Publication Number 2014-65329.

SUMMARY OF THE INVENTION

Problems to be Solved by the Invention

A problem that is solved by the present invention is that there is a possibility that when the airbag is deployed in a state in which the airbag is caught inside of a trim covering, in particular, a front pillar trim covering and a rear pillar trim covering, the trim coverings are damaged.

Means for Solving the Problems

An object of the present invention is to prevent edges of trim coverings, in particular, a front pillar trim covering and a rear pillar trim covering from being cracked and scattered at the time of deploying an airbag.

The present invention relates to a curtain airbag device having an airbag that is mountable along a roof side rail of a vehicle in a vehicle longitudinal direction of the vehicle so as to configured to be stored in the vehicle and that is deployed in a curtain-like manner along a side window in a vehicle compartment by a gas generated by an inflator in case of emergency.

Further, in order to achieve the above object, the present invention includes the following most essential features: the airbag which is folded has a cover cloth that is wound to cover at least part of an outer circumference of the airbag that extends in a longitudinal direction of the airbag; the cover cloth has a first folded-back part that is configured by folding back one end of the cover cloth in a circumferential direction of the outer circumference of a cross section, which is perpendicular to the longitudinal direction, of the folded airbag; and an edge of the outer circumference of the folded airbag is held between the first folded-back part and the other end of the cover cloth.

In other words, the following is the most essential feature: the first folded-back part is inserted into a folding gap of the folded airbag from an edge of the outer circumference of the folded airbag.

In the present invention, the folded states of the airbag may be either a roll state that is configured by winding the airbag or a bellows-like folded state that is configured by bellows-like folding the airbag.

In the airbag that is wound in the roll state, it is preferred to have a second folded-back part that is configured by folding back an edge of the outer circumference of the airbag in a direction opposite to a winding direction to cover part of the outer circumference of the airbag. In this case, the first folded-back part of the cover cloth is inserted into a gap between a main body of the airbag that is wound in the roll state and the second folded-back part.

Further, in the airbag that is folded in the bellows-like manner, it is preferred to have a third folded-back part at one end of the bellows-like folded airbag, and the third folded-back part is configured by folding back an edge of the folded airbag so as to cover part of an outside of the folded airbag. In this case, the first folded-back part of the cover cloth is inserted into a gap between a main body of the airbag that is folded in the bellows-like manner and the third folded-back part.

In addition, in the present invention, from the perspective of securely maintaining the airbag mounted state to the vehicle and of protecting the trim coverings from such as a cracking at the time of deploying the airbag, it is preferred that the cover cloth is thicker or harder than a base fabric that forms the airbag.

Because the cover cloth has a proper hardness, at the time of deploying the airbag, a cushion base fabric is hardly caught at an edge of the trim covering so that the airbag is smoothly deployed. Further, the damage to the edge of the trim covering is reduced and the cracking of the trim covering itself can also be prevented.

The hardness of the cloth is measured by measuring the bending resistance according to a cantilever method (Standards: ISO9073-7, ASTM D-5732, GB/T18318-2001, JIS L-1906, JIS L-1912, JIS L-1913, JIS L-1096, and JIS L-1018).

The bending resistance indicates a hardness and a softness when a cloth is bent and can be measured by a cantilever tester. The cantilever tester has a tilted surface at angle of 45 degrees in regard to a general woven fabric and at angle of 41.5 degrees in regard to a nonwoven fabric and has a smooth flat surface which is horizontal at the time of the installation of the tester and is continuously provided with the tilted surface at an upper edge of the tilted surface.

On this flat surface, a cloth as a test piece is placed in a manner in which one end of the cloth aligns with a boundary between the flat surface and the tilted surface, the cloth, which is pressed by a flat metal plate from above, gently slides toward the tilted surface, and a scale (a length) is read when a center of the end of the test piece contacts the slope.

The bending resistance is indicated by the length of the cloth that is extruded and it is shown that the longer length is the harder cloth. As compared with a cloth of an ordinary airbag, for instance, a webbing that is used for a vehicle seat belt has a high bending resistance (a measured value is long) and hard, therefore, it is in a preferable state. On the other hand, when it is the same material and the same fabric, the thicker fabric has the higher bending resistance (the measured value is long) and hard, therefore, it is in a preferable state.

In a mounting structure of the curtain airbag device on a vehicle according to the present invention, when the airbag is mounted on the roof side rail and a pillar of the vehicle by using a tab that is attached to a base fabric of the airbag so that the airbag extends in a vehicle longitudinal direction, the airbag is mounted by using the tab that is integrally attached to the cover cloth and the base fabric of the airbag at a mounting position of the cover cloth. The above configuration is the mounting structure of the curtain airbag device on the vehicle according to the present invention.

The pillar in the mounting structure of the curtain airbag device on the vehicle according to the present invention is a front pillar and/or a rear pillar.

In the mounting structure, it is preferred that at least part of the cover cloth is overlapped with an edge of a roof trim covering side of a pillar trim covering of the pillar. Alternatively, it is preferred that the cover cloth is disposed at a seam between the pillar trim covering and a roof trim covering.

According to these configurations, at the time of deploying the airbag, a direct damage that is affected to the edge of the trim covering can be reduced so that the cracking of the trim covering can be prevented.

In the present invention, in regard to the cover cloth that covers the outer circumference of the airbag, the first folded-back part that is provided at one end of the cover cloth in a circumferential direction of the outer circumference of a cross section, which is perpendicular to the longitudinal direction, of the folded airbag and the other end of the cover cloth sandwich an edge of the outer circumference of the folded airbag. In other words, the first folded-back part of the cover cloth is inserted into a folding gap of the folded airbag from the edge of the outer circumference of the folded airbag.

Therefore, at the time of deploying the airbag, because the cover cloth can be certainly released, the airbag is smoothly deployed in the expected deployment direction so that the edges of the front pillar trim covering and the rear pillar trim covering are not cracked and scattered.

Effects of the Invention

According to the present invention, in regard to the cover cloth, the first folded-back part that is provided at one end of the cover cloth in the circumferential direction of the outer circumference of the cross section, which is perpendicular to the longitudinal direction, of the folded airbag and the other end of the cover cloth sandwich the edge of the outer circumference of the folded airbag. In other words, the first folded-back part of the cover cloth is inserted into the folding gap of the folded airbag from the edge of the outer circumference of the folded airbag.

Therefore, at the time of deploying the airbag, the cover cloth can be certainly released, without a deterioration of the deployment performance of the airbag. In accordance with the deployment of the cover cloth, the cover cloth extrudes the trim covering and covers the edge of the trim covering at an outlet (an opening) of the airbag. As a result, the cover cloth prevents the bag from being caught at the edge of the trim covering and helps the smooth deployment of the airbag. Therefore, because the edges of the front pillar trim covering and the rear pillar trim covering are not cracked and scattered, the safety of the occupants can be secured.

BRIEF DESCRIPTION OF THE DRAWINGS

FIGS. 1A, 1B and 1C are diagrams that explain principal parts of a curtain airbag device according to a first aspect of the present invention. FIG. 1A shows a state in which an insertion length of a first folded-back part of a cover cloth is maximum and a distance between a folded-back position of the cover cloth and a folded-back position of the airbag is minimum. FIG. 1B shows a state in which the insertion length of the first folded-back part of the cover cloth is minimum and the distance between the folded-back position of the cover cloth and the folded-back position of the airbag is maximum. FIG. 1C shows a state corresponding to an intermediate level between FIGS. 1A and 1B.

MODE FOR CARRYING OUT THE INVENTION

An object of the present invention is to prevent edges of trim coverings, in particular, a front pillar trim covering and a rear pillar trim covering from being cracked and scattered at the time of deploying an airbag.

The object can be achieved by sandwiching an edge of an outer circumference of a folded airbag between a first folded-back part that is provided at one end of a cover cloth and the other end side. In other words, the object can be achieved by inserting the first folded-back part of the cover cloth into a folding gap of the folded airbag from the edge of the outer circumference of the folded airbag so as to cover the outer circumference of the airbag.

EMBODIMENTS

A curtain airbag device and a mounting structure of the curtain airbag device on a vehicle according to a first aspect of the present invention will be explained below with reference to FIGS. 1-5.

Figure 9:
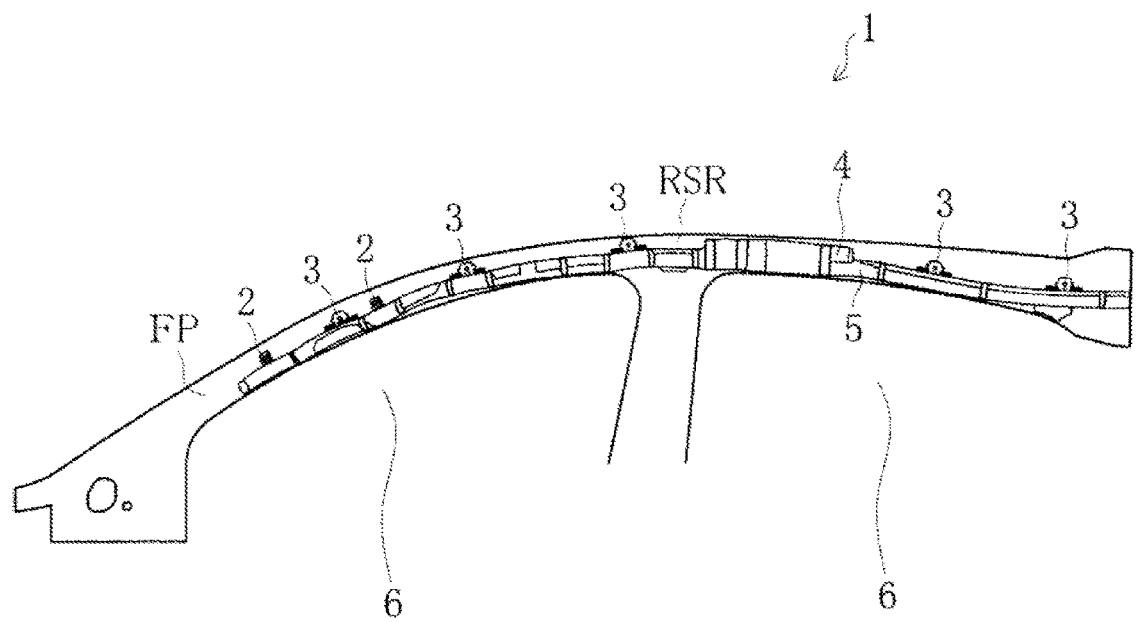
FIG. 9 is a diagram that shows a mounting state in which a curtain airbag device is mounted on a vehicle when viewed from a side of the vehicle.

A curtain airbag device 1 according to the present invention has an airbag 5 that is deployed in a curtain-like manner along a side window 6 (refer to FIG. 9) by a gas being ejected from an inflator 4 (refer to FIG. 9). Further, because of the deployment of the airbag 5, a seated occupant's head is protected, and at the same time, an occupant is prevented from being thrown out to the outside of a vehicle.

The airbag 5 is formed in a long state that is provided by being wound in, for instance, a roll state in a substantially up and down direction. Further, a body member 5a that is wound in the roll state has a second folded-back part 5b at an edge of an outer circumference of the body member 5a, and the second folded-back part 5b, which is folded back in an direction opposite to a winding direction of the body member 5a, covers a part of the outer circumference of the body member 5a.

A reference numeral 7 is a cover cloth that is provided at a part corresponding to a front pillar FP (refer to FIG. 9) of the airbag 5, which is wound in the roll state and in the long state. The cover cloth 7 is made by, for example, a webbing that is used for a vehicle seat belt, and alternatively made by a thick cloth that is thicker than a base fabric 5d that forms the airbag 5.

The cover cloth 7 has a length (refer to FIG. 3) that makes it possible to round around the outer circumference of the body member 5a of the airbag 5 that is wound in the roll state and has a first folded-back part 7a that is obtained by folding back one end side in a circumferential direction of the outer circumference of a cross section which is perpendicular to a longitudinal direction of the airbag 5. Further, the first folded-back part 7a is inserted between the body member 5a and the second folded-back part 5b from a folded-back position 5c of the second folded-back part 5b of the airbag 5. As a result, the other end side 7b and the first folded-back part 7a of the cover cloth 7 sandwich the folded-back position 5c, and the outer circumference of the body member 5a of the airbag 5 is wrapped with it. Thereafter, it is fixed by a tape 8 (refer to FIGS. 4A and 4B).

An insertion length L of the first folded-back part 7a of the cover cloth 7 and a distance d between a folded-back position 7c of the cover cloth 7 and the folded-back position 5c of the airbag 5 are not particularly limited so along as they are within the ranges shown in FIGS. 1A-1C.

That is, FIG. 1A shows a state in which the insertion length L of the first folded-back part 7a of the cover cloth 7 is maximum and the distance d between the folded-back position 7c of the cover cloth 7 and the folded-back position 5c of the airbag 5 is minimum.

Further, FIG. 1B shows a state in which the insertion length L of the first folded-back part 7a of the cover cloth 7 is minimum and the distance d between the folded-back position 7c of the cover cloth 7 and the folded-back position 5c of the airbag 5 is maximum.

Further, FIG. 1C shows a state in which the insertion length L of the first folded-back part 7a of the cover cloth 7 and the distance d between the folded-back position 7c of the cover cloth 7 and the folded-back position 5c of the airbag 5 are at the intermediate level between FIGS. 1A and 1B.

In addition, the other end side 7b of the cover cloth 7 is attached to the base fabric 5d that is located at an upper end of the airbag 5, for instance, by sewing. Further, a tab 9 is sewn together with the base fabric 5d and the cover cloth 7 at, for instance, a center of the cover cloth 7 that is attached to the base fabric 5d in the longitudinal direction (refer to FIG. 3). Note that in FIG. 3, a reference numeral 10 corresponds to a sewing part in which the base fabric 5d, the cover cloth 7, and a tab 9 are integrally sewn and a reference numeral 5a a corresponds to an upper edge of the body member 5a that is wound in the roll state of the airbag 5.

The curtain airbag device 1 is mounted, by using the tab 9 that is attached to the base fabric 5d that is located at the upper end of the airbag 5, along with the inflator 4 on, for instance, the front pillar FP and the roof side rail RSR of the compartment so as to extend in a vehicle longitudinal direction of the vehicle (refer to FIG. 9). At that time, it is mounted on the front pillar FP by using a bracket 3 that is attached to the tab 9 at an attaching position of the cover cloth 7.

Figure 4A:
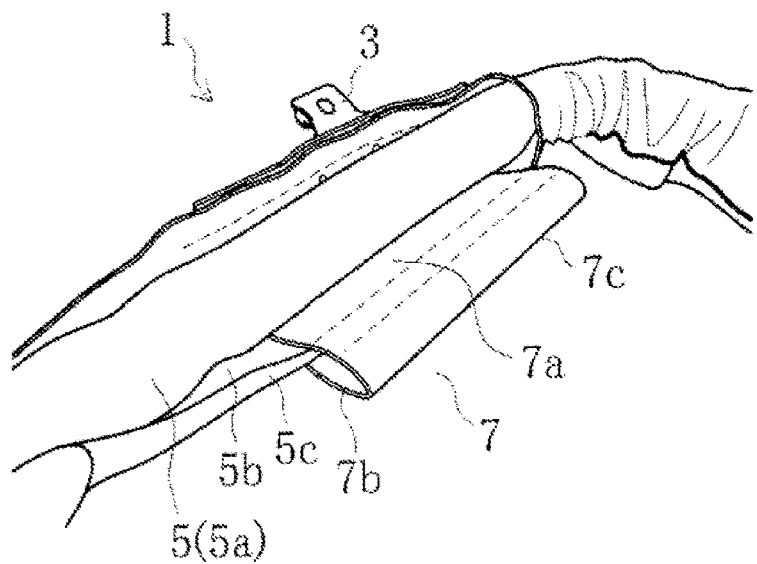
FIGS. 4A, 4B, and 4C are diagrams that explain a mounting state in which the principal parts of the curtain airbag device are mounted on the vehicle in order from FIG. 4A to FIG. 4C according to the first aspect of the present invention.
Figure 4B:
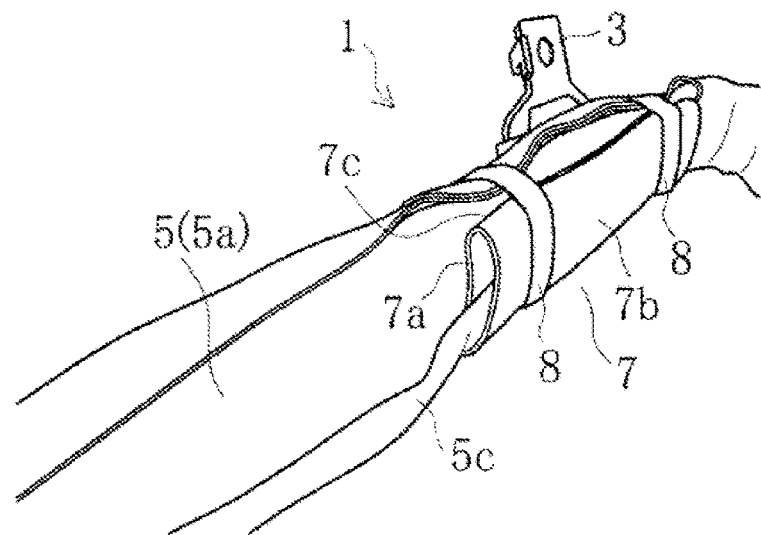
Figure 4C:
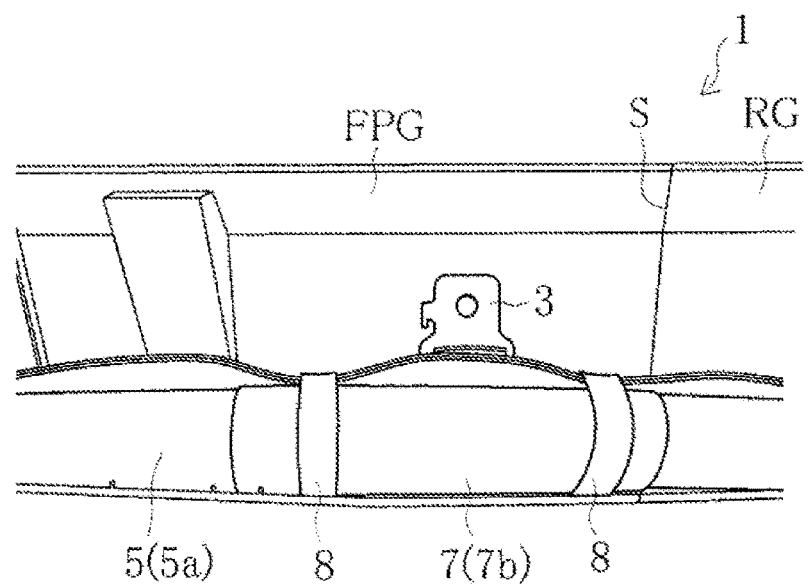

In a mounting structure of the curtain airbag device 1, at least a part of the cover cloth 7 is provided so as to overlap with an end part of a front pillar trim covering FPG on a side of a roof trim covering RG (refer to FIG. 4C). In the example shown in FIG. 4C, the entirety of the cover cloth 7 is overlapped with the end part of the front pillar trim covering FPG on the side of the roof trim covering RG.

Because the cover cloth 7 is much softer and easily deformed than the trim covering, the cover cloth 7 smoothly covers a lower end of the front pillar trim covering FPG when the front pillar trim covering FPG is pushed to open. Therefore, the cover cloth 7 is deployed so as to extend from the lower end of the front pillar trim covering FPG and helps the smooth deployment of the airbag 5.

Figure 5:
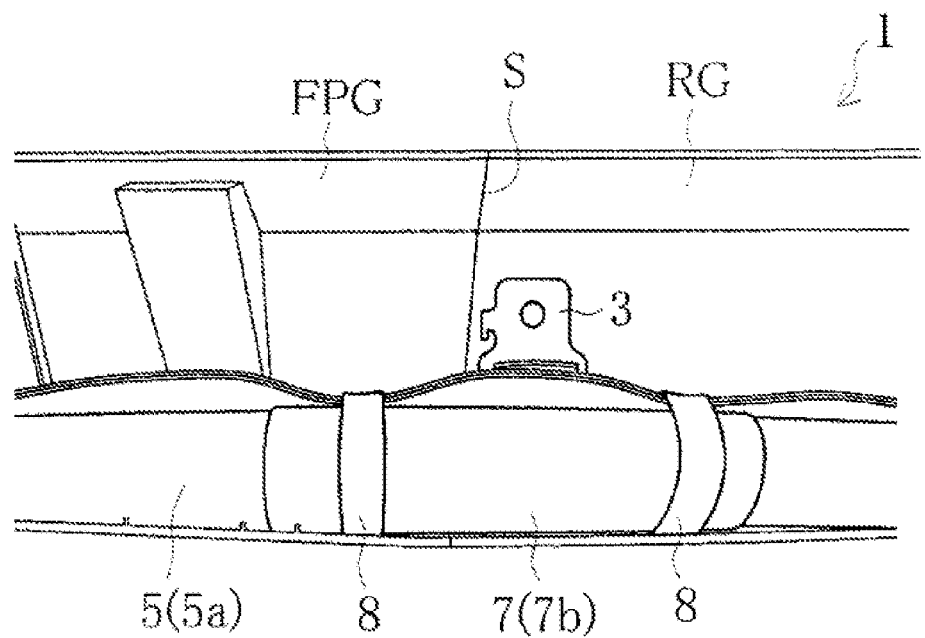
FIG. 5 is a diagram that explains another example of the mounting state in which the principal parts of the curtain airbag device are mounted on the vehicle according to the first aspect of the present invention.

Further, in the mounting structure of the curtain airbag device 1, as shown in FIG. 5, the cover cloth 7 may also be provided so as to span a seam S between the front pillar trim covering FPG and the roof trim covering RG on the side of the roof side rail.

When the cover cloth 7 is provided so as to span the seam S, the cover cloth 7 smoothly covers an opening lower end part of the seam between the front pillar trim covering FPG and the roof trim covering RG that open differently at the time of deploying the airbag 5. Therefore, because a level difference at a position of the opening lower end part is eliminated, it becomes possible to prevent the airbag 5 from being caught.

According to the mounting structures explained above, at the time of deploying the airbag 5, because a direct damage that is applied to the end part of the front pillar trim covering FPG on the side of the roof trim covering RG can be reduced, the cracking of the front pillar trim covering FPG can be prevented.

In the present invention, when the high load that is higher than a predetermined value is applied to a vehicle body side part due to the side collision or the rollover, the gas, which is ejected from the inflator 4 by receiving a signal from a sensor, is supplied to a chamber via a duct so that the airbag 5 is deployed in the curtain-like manner.

Figure 2A:
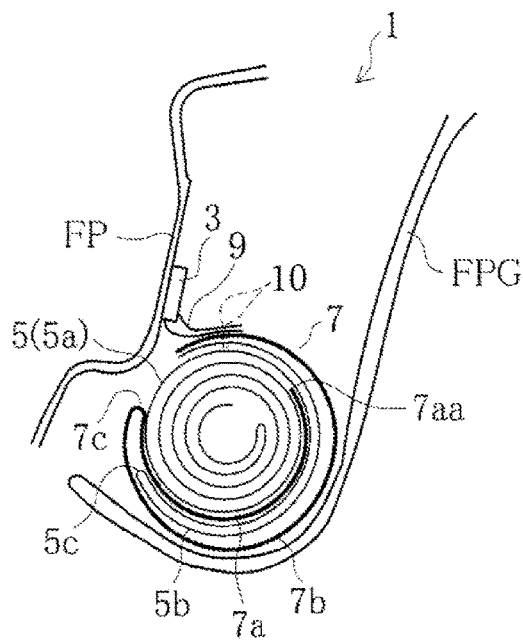
FIGS. 2A, 2B, 2C, and 2D are diagrams that explain a deploying state of the curtain airbag device in order from FIG. 2A to FIG. 2D according to the first aspect of the present invention.
Figure 2B:
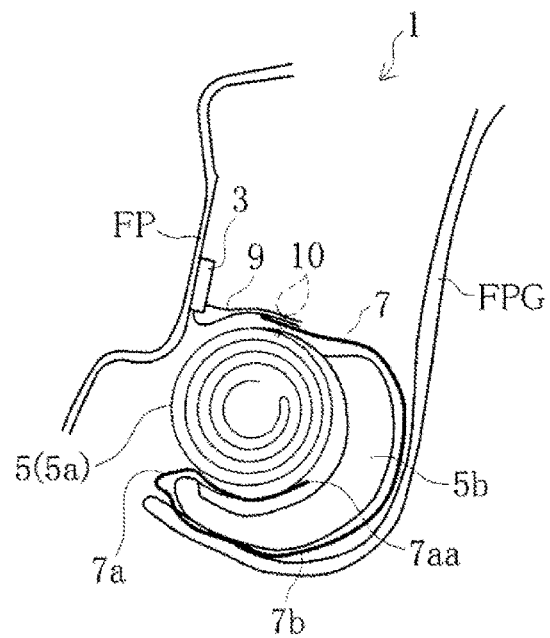
Figure 2C:
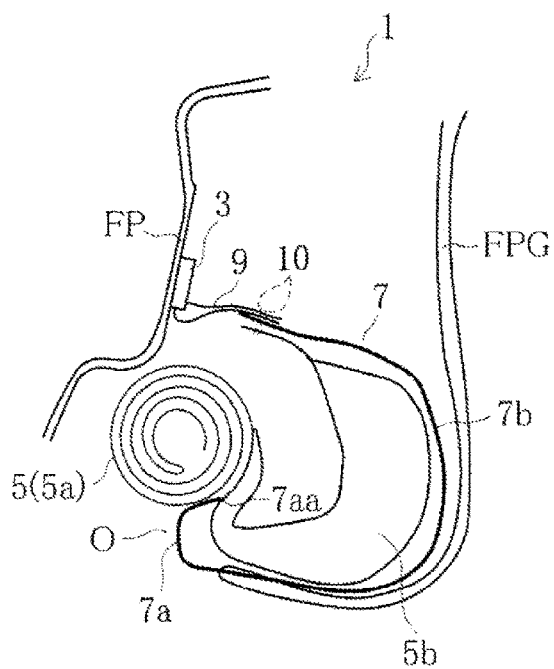
Figure 2D:
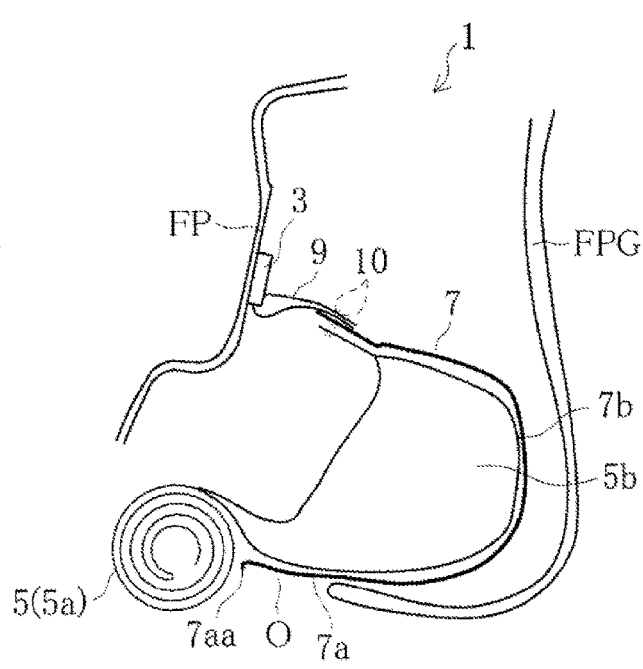
Figure 3:
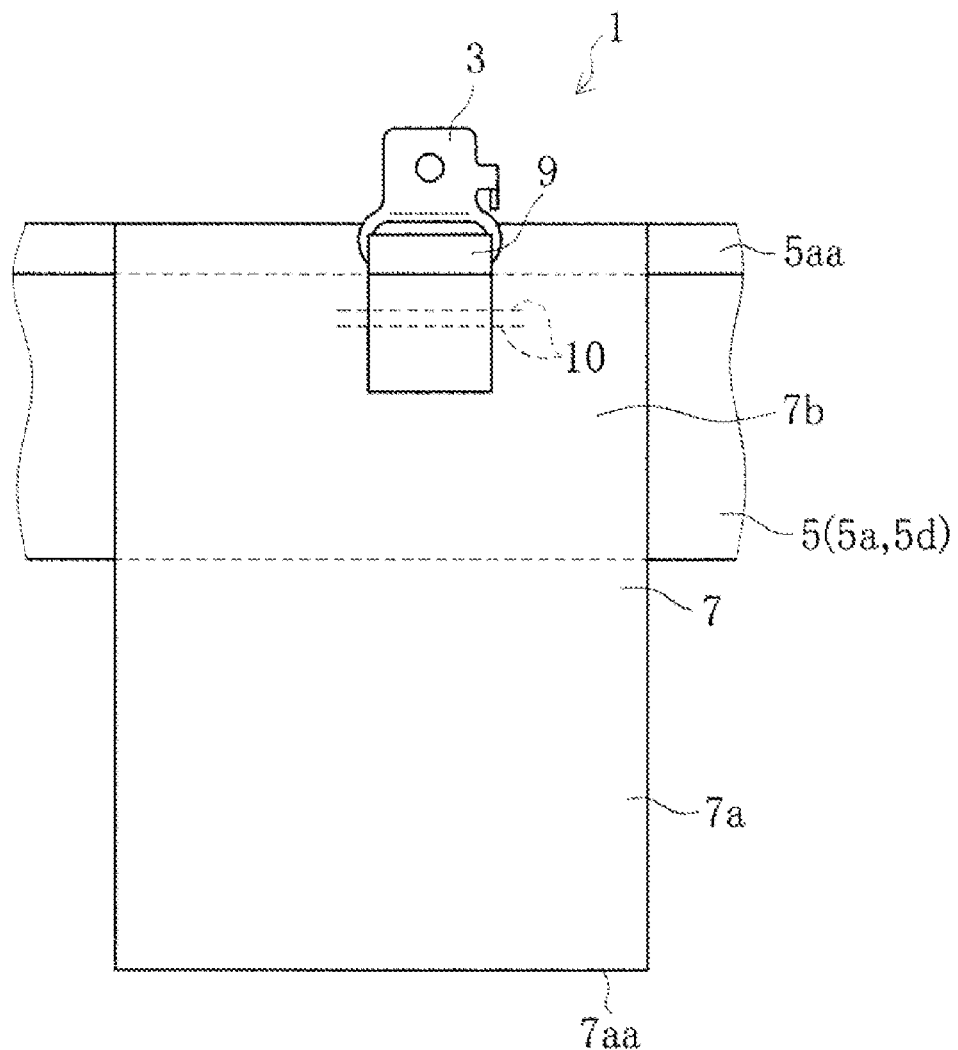
FIG. 3 is a diagram that explains a mounting part in which the principal parts of the curtain airbag device are mounted on a vehicle according to the first aspect of the present invention.

At the time of deploying the airbag 5, the second folded-back part 5b is deployed beginning of a storage state shown in FIG. 2A and then continuing of states shown in FIGS. 2B to 2D in such order. Because of the deployment of the second folded-back part 5b, the first folded-back part 7a of the cover cloth 7 that is inserted between the body member 5a and the second folded-back part 5b of the airbag 5 can be certainly released.

FIG. 2A shows the state in which the airbag 5 is stored inside the front pillar FP. Once the airbag 5 starts to be deployed by the operation of the inflator, the second folded-back part 5b that is located at the compartment side with respect to the airbag 5 starts to be deployed and starts to push the front pillar trim covering FPG toward the compartment side (FIG. 2B).

As the expansion and the deployment are advanced, an opening O that is formed between the front pillar FP and the front pillar trim covering FPG is pushed and expanded. Even when the opening O is expanded, an area adjacent to the lower end of the cover cloth 7 still remains in the opening because of further extending in a direction toward the front pillar from the lower end part of the front pillar trim covering FPG (FIG. 2C).

In spite of the state in which the opening O is completely opened and the body member 5a of the airbag 5 comes out from the front pillar trim covering FPG, the area adjacent to the lower end of the cover cloth 7 covers the lower end part of the front pillar trim covering FPG (FIG. 2D).

Thereafter, as the deployment of the airbag 5 is advanced, an end part 7a a of the first folded-back part 7a of the cover cloth 7 downwardly hangs down and deforms so as to eliminate a protrusion of the lower end part of the front pillar trim covering FPG. Therefore, because the airbag 5 is not caught by the lower end part of the front pillar trim covering FPG, the deployment is smoothly performed.

In the present invention explained above, the airbag 5 is deployed in the expected deployment direction and the edge of the front pillar trim covering FPG is not cracked and scattered.

It will be apparent that the present invention is not limited to the above examples and the above embodiments may be varied in many ways so long as such variations are included with in the scope of the technical ideas recited in each of the claims.

Specifically, the embodiments that are explained with reference to FIGS. 1-5 are preferred examples according to the present invention, and however, other embodiments can be carried out and performed in various ways. Unless there are restrictive descriptions in the specification, the present invention should not be limited to the detailed configurations, sizes, and arrangement of the parts shown in the attached drawings. Further, the expressions and terms in the specification are used for the purpose of explanations so that they should not be limited unless there are restrictive descriptions.

Figure 6:
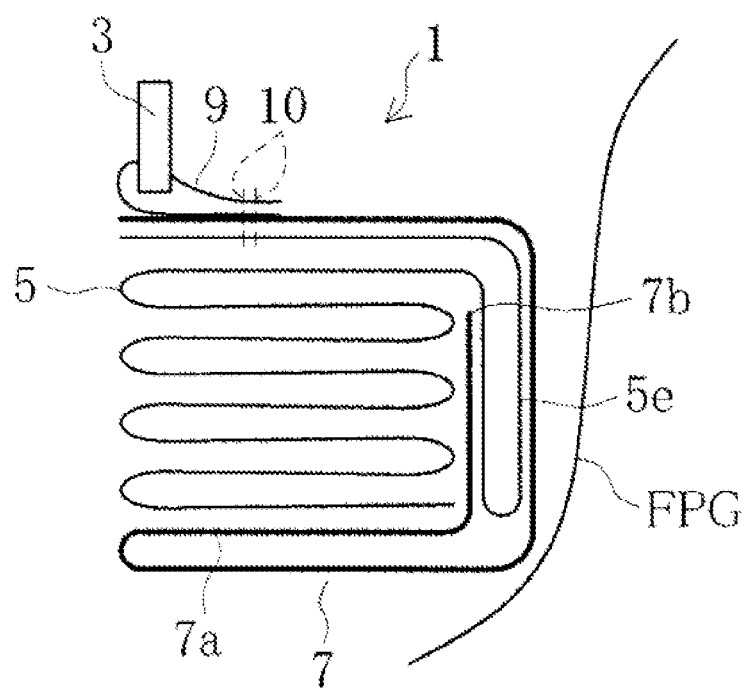
FIG. 6 is a diagram that explains principal parts of a curtain airbag device according to a second aspect of the present invention.

For instance, in the embodiments shown in FIGS. 1-5, the airbag 5 that is folded in the roll state is shown. However, as shown in FIG. 6, it can also be adopted that the airbag 5 is folded in a bellows-like manner and a third folded-back part 5e that is obtained by folding back one end of the airbag 5 covers a part of the outside of the airbag 5.

Figure 7A:
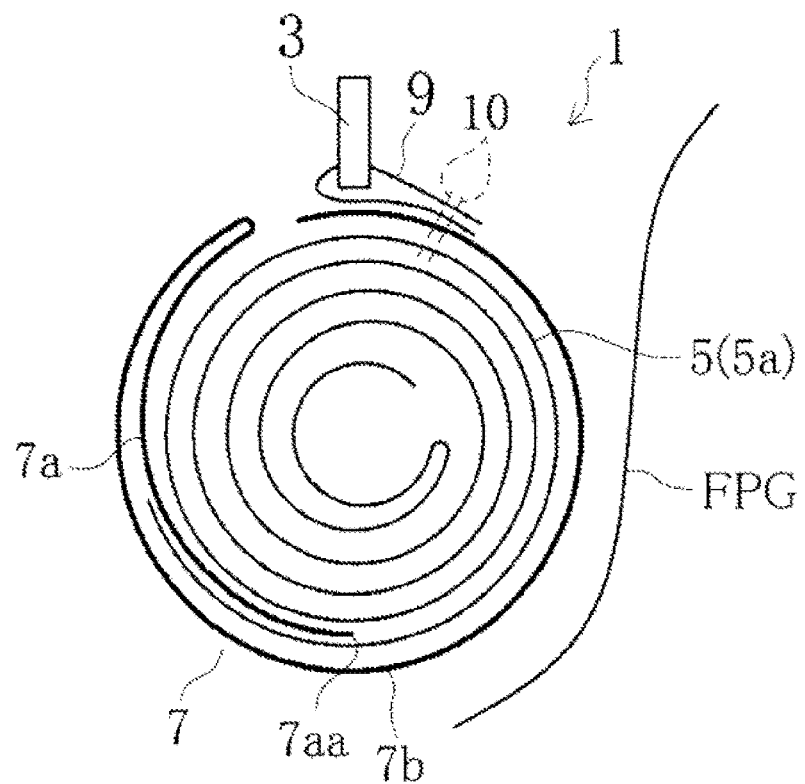
FIG. 7A is a diagram that explains principal parts of a curtain airbag device according to a third aspect of the present invention.
Figure 7B:
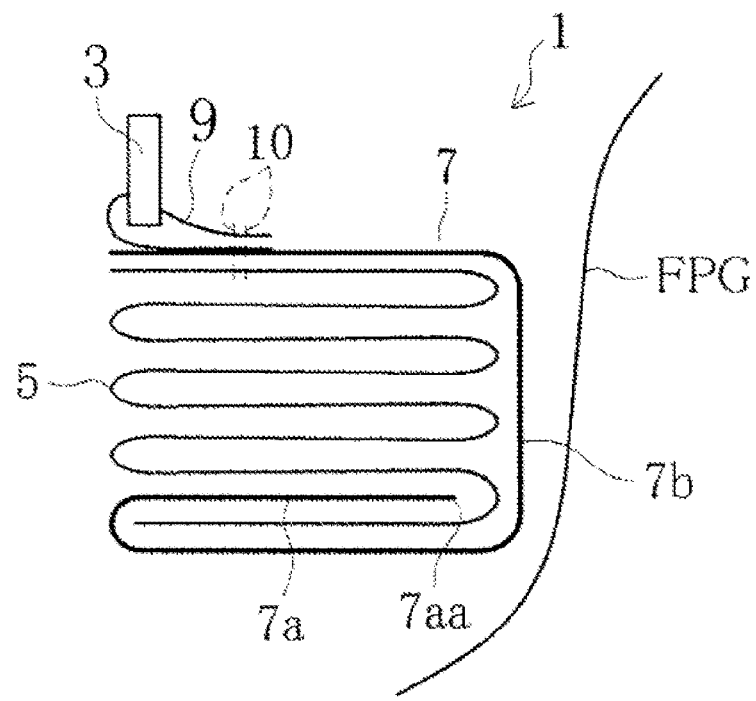
FIG. 7B is a diagram that explains principal parts of a curtain airbag device according to a fourth aspect of the present invention.

Further, with respect to the airbag 5 that is folded in the roll state, it can also be adopted that the second folded-back part 5b is not provided as shown in FIG. 7A. Further, with respect to the airbag 5 that is folded in the bellows-like manner, it can also be adopted that the third folded-back part 5e is not provided as shown in FIG. 7B.

Figure 8:
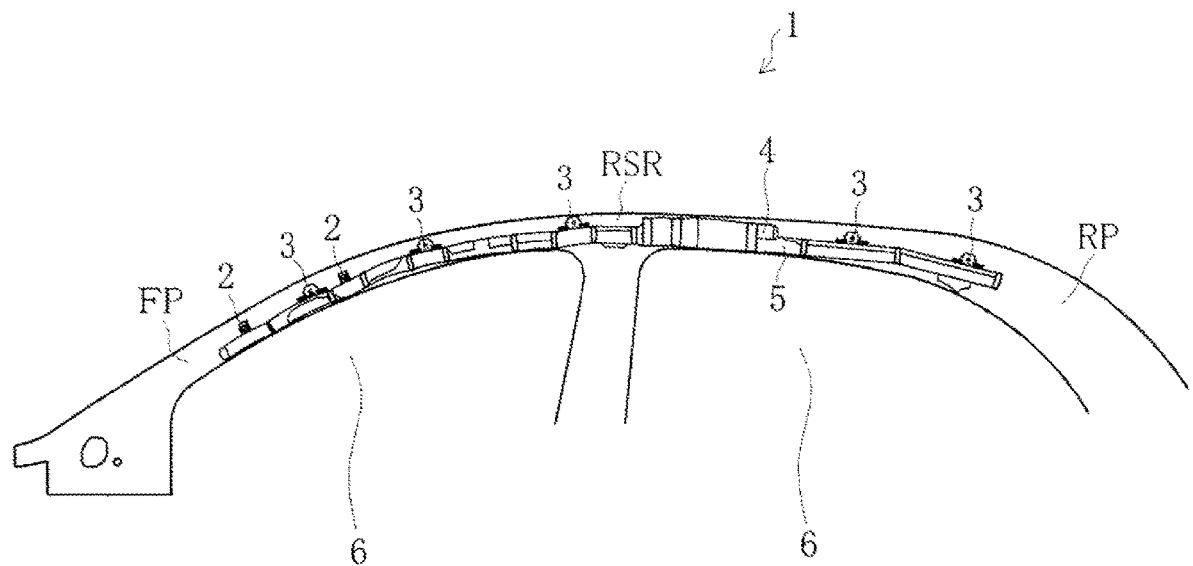
FIG. 8 is a diagram that shows another example of a mounting state in which a curtain airbag device is mounted on a vehicle when viewed from a side of the vehicle.

Further, in the embodiments explained above, the damage prevention for the front pillar trim covering FPG is explained. However, as shown in FIG. 8, when the airbag 5 is provided even to cover a rear pillar RP, the damage of a rear pillar trim covering at the time of deploying the airbag 5 can be prevented as well by adopting the same configuration.

Further, in the embodiments explained above, the cover cloth 7, which is made by the fabric that is thicker than the base fabric 5d forming the airbag 5 or with the harder fabric such as a webbing, is explained. However, as a material of the cover cloth 7, any material that is harder than the base fabric 5d forming the airbag 5 and at the same time that is softer than the trim covering can be used.

EXPLANATION OF REFERENCE SIGNS

1 Curtain Airbag Device
4 Inflator
5 Airbag
5a Body Member
5b Second Folded-Back Part
5d Base Fabric
5e Third Folded-Back Part
6 Side Window
7 Cover Cloth
7a First Folded-Back Part
7a a End Part
7b the other end side
9 Tab
FP Front Pillar
FPG Front Pillar Trim Covering
RSR Roof Side Rail
RG Roof Trim Covering
RP Rear Pillar

What is claimed is:

1. A curtain airbag device comprising:
   an airbag mountable along a roof side rail of a vehicle in a vehicle longitudinal direction of the vehicle and configured for deployment in a curtain manner along a side window in a vehicle compartment by a gas generated by an inflator, the airbag wound in a rolled state and having a folded-back airbag portion at an outer circumference thereof;
   a cover cloth covering at least part of the outer circumference of the airbag when the airbag is stored, the cover cloth extending in a longitudinal direction of the airbag; and
   a first folded-back part of the cover cloth configured by folding back a first end of the cover cloth at a longitudinally extending fold in a circumferential direction,
   wherein the longitudinally extending fold is located on the outer circumference of the airbag and the folded-back airbag portion is held between the first folded-back part of the over cloth and a second end of the cover cloth such that the cover cloth is on first and second opposite circumferential sides of the folded-back airbag portion.

2. The curtain airbag device according to claim 1, wherein the cover cloth is a thicker fabric that is thicker than a base fabric that configures the airbag.

3. The curtain airbag device according to claim 1, wherein the cover cloth is a harder fabric that is harder than a base fabric that configures the airbag.

4. The curtain airbag device according to claim 1 in combination with a mounting structure, the mounting structure comprising a tab for mounting the airbag on the roof side rail and a pillar of the vehicle, the tab attached to a base fabric of the airbag so that the airbag extends in the vehicle longitudinal direction, the tab integrally attached to the cover cloth and the base fabric of the airbag at a mounting position of the cover cloth.

5. The curtain airbag device according to claim 4, wherein the pillar is a front pillar.

6. The curtain airbag device according to claim 4, wherein the pillar is a rear pillar.

7. The curtain airbag device according to claim 4, wherein the pillar is each of a front pillar and a rear pillar.

8. The curtain airbag device according to claim 4, wherein at least part of the cover cloth is overlapped with an edge of a roof trim covering of the roof side rail.

9. The curtain airbag device according to claim 4, wherein the cover cloth is disposed at a seam between a pillar trim covering of the pillar and a roof trim covering of the roof side rail.

10. The curtain airbag device according to claim 1, wherein the folded-back airbag portion is releasably held between the first folded-back part of the cover cloth and a second end of the cover cloth such that the second end of the cover cloth is releasable from the folded-back airbag portion upon inflation of the airbag.

11. A curtain airbag device comprising:
    an airbag mountable along a roof side rail of a vehicle in a vehicle longitudinal direction of the vehicle and configured for deployment in a curtain manner along a side window in a vehicle compartment by a gas generated by an inflator, the airbag normally stored in a condition including a main portion selected from a group consisting of a rolled portion and a bellows folded portion, the airbag further including a folded-back airbag portion;
    a cover cloth covering at least part of an outer perimeter of the airbag when the airbag is stored, the cover cloth extending in a longitudinal direction and including first and second longitudinally extending edges, the first longitudinally extending edge for connection to the vehicle; and
    a folded-back cover cloth part configured by folding back the second longitudinally extending edge,
    wherein the folded-back cover cloth part is releasably held between the main portion of the airbag and the folded-back airbag portion such that the second longitudinally extending edge is releasable from the airbag upon deployment of the airbag.

12. The curtain airbag device according to claim 11, wherein the airbag that is wound in a rolled state to include the rolled portion and the folded-back airbag portion is configured by folding back an edge of an outer circumference of the airbag in a direction opposite to a winding direction to cover part of the outer circumference of the airbag.

13. The curtain airbag device according to claim 11, wherein the airbag is folded to include the bellows folded portion.

14. The curtain airbag device according to claim 11, wherein the cover cloth is a thicker fabric that is thicker than a base fabric that configures the airbag.

15. The curtain airbag device according to claim 11, wherein the cover cloth is a harder fabric that is harder than a base fabric that configures the airbag.

16. The curtain airbag device according to claim 11 in combination with a mounting structure, the mounting structure comprising a tab for mounting the airbag on the roof side rail and a pillar of the vehicle, the tab attached to a base fabric of the airbag so that the airbag extends in the vehicle longitudinal direction, the tab integrally attached to the cover cloth and the base fabric of the airbag at a mounting position of the cover cloth.

17. The curtain airbag device according to claim 11, wherein the folded-back cover cloth part is releasably held between the folded-back airbag portion and the second longitudinally extending edge of the cover cloth such that the cover cloth is on first and second opposite sides of the folded-back airbag portion.

18. A curtain airbag device comprising:
    an airbag mountable along a roof side rail of a vehicle in a vehicle longitudinal direction of the vehicle and configured for deployment in a curtain manner along a side window in a vehicle compartment by a gas generated by an inflator, the airbag normally stored in a condition including a main portion selected from a group consisting of a rolled portion and a bellows folded portion;
    a cover cloth covering at least part of an outer perimeter of the airbag when the airbag is stored, the cover cloth extending in a longitudinal direction and including first and second longitudinally extending cover cloth edges, the first longitudinally extending cover cloth edge for connection to the vehicle; and
    a folded-back cover cloth part configured by folding back the second longitudinally extending cover cloth edge,
    wherein the folded-back cover cloth part is releasably held between an outermost portion of the airbag and a remainder of the airbag such that the second longitudinally extending edge is releasable from the airbag upon deployment of the airbag.

19. The curtain airbag device of claim 18, wherein the airbag includes the bellows folded portion and the cover cloth is releasably held between the main portion of the airbag and a longitudinally extending airbag edge of the airbag.

20. The curtain airbag device of claim 18, wherein the airbag includes the rolled portion and the cover cloth is releasably held between the main portion of the airbag and a longitudinally extending airbag edge of the airbag.

* * * * *